United States Patent
Sauer

(10) Patent No.: US 9,040,004 B2
(45) Date of Patent: May 26, 2015

(54) METHOD AND DEVICE FOR CLEANING EXHAUST GASES BY WAY OF FLUIDIZED BED REACTORS

(75) Inventor: Harald Sauer, Frankfurt am Main (DE)

(73) Assignee: Fujiang Lonjing Environment Technology Co., Ltd., Fujian (CN)

( * ) Notice: Subject to any disclaimer, the term of this patent is extended or adjusted under 35 U.S.C. 154(b) by 0 days.

(21) Appl. No.: 14/239,173

(22) PCT Filed: Jun. 11, 2012

(86) PCT No.: PCT/EP2012/061001
§ 371 (c)(1),
(2), (4) Date: Apr. 3, 2014

(87) PCT Pub. No.: WO2013/023800
PCT Pub. Date: Feb. 21, 2013

(65) Prior Publication Data
US 2014/0356264 A1    Dec. 4, 2014

(30) Foreign Application Priority Data
Aug. 17, 2011    (DE) .......................... 10 2011 052 788

(51) Int. Cl.
| | | |
|---|---|---|
| *B01D 53/34* | (2006.01) | |
| *B01D 53/83* | (2006.01) | |
| *B01J 8/24* | (2006.01) | |
| *B01D 53/40* | (2006.01) | |
| *B01D 53/50* | (2006.01) | |
| *B01D 53/68* | (2006.01) | |
| *B01D 53/75* | (2006.01) | |
| *B01D 53/88* | (2006.01) | |

(52) U.S. Cl.
CPC .............. *B01D 53/40* (2013.01); *B01D 53/508* (2013.01); *B01D 53/685* (2013.01); *B01D 53/75* (2013.01); *B01D 53/83* (2013.01); *B01D 2251/404* (2013.01); *B01D 2258/0283* (2013.01); *B01D 53/885* (2013.01)

(58) Field of Classification Search
CPC ............ B01D 53/34; B01D 53/83; B01J 8/24
USPC ........................... 423/210; 422/139, 145, 147
See application file for complete search history.

(56) References Cited

U.S. PATENT DOCUMENTS
3,885,934 A    5/1975    Eads et al.
4,176,019 A    11/1979    Dethloff
(Continued)

FOREIGN PATENT DOCUMENTS
DE    35 26 008 A1    1/1987
DE    38 79 706 T2    9/1993
(Continued)

OTHER PUBLICATIONS
International Search Report dated Sep. 4, 2012 in PCT/Ep 2012/061001.

*Primary Examiner* — Timothy Vanoy
(74) *Attorney, Agent, or Firm* — Maier & Maier, PLLC

(57) ABSTRACT

The invention relates to a method for cleaning exhaust gases, in which an exhaust gas and a sorbent are combined in a fluidized bed reactor. In a subsequent filter system, solid matter is segregated, and thereafter, up to 99 per cent of the sorbent is re-channeled into the fluidized bed reactor, wherein the gas is subjected to a rotation around the flow axis in the fluidized bed reactor.

10 Claims, 3 Drawing Sheets

(56) References Cited

U.S. PATENT DOCUMENTS

| | | | |
|---|---|---|---|
| 4,518,750 A | 5/1985 | Govoni et al. | |
| 4,562,054 A | 12/1985 | Bhatia | |
| 4,861,562 A * | 8/1989 | Rowe | 422/143 |
| 5,032,143 A | 7/1991 | Ritakallio | |
| 5,238,659 A | 8/1993 | Tajiri et al. | |
| 5,662,049 A | 9/1997 | Shimizu et al. | |
| 5,993,765 A | 11/1999 | Beisswenger et al. | |
| 8,889,077 B2 | 11/2014 | Feldkamp et al. | |
| 2004/0101459 A1 * | 5/2004 | Schur | 423/210 |
| 2008/0159922 A1 | 7/2008 | Sauer et al. | |

FOREIGN PATENT DOCUMENTS

| | | | |
|---|---|---|---|
| DE | 195 17 863 A1 | 11/1996 | |
| EP | 0 137 599 B1 | 4/1985 | |
| EP | 2 263 780 A1 | 12/2010 | |
| EP | 2263780 A1 | 12/2010 | |
| JP | 63-310633 * | 12/1988 | C01B 19/04 |
| WO | 20061032288 A1 | 3/2006 | |

* cited by examiner

Section B-B

METHOD AND DEVICE FOR CLEANING EXHAUST GASES BY WAY OF FLUIDIZED BED REACTORS

The present invention relates to a method and an apparatus for cleaning exhaust gases using a circulating fluidized bed.

Circulating fluidized beds are used in various technical processes to bring solids in close contact with gases, liquids or other solids.

Fluidized bed systems are also used according to the prior art for cleaning exhaust gases by separating harmful gases such as SOx and/or HCl and/or HF from flue gases. In such a system according to the prior art, a flue gas is injected into a fluidized bed reactor via a supply line. A sorbent such as calcium hydroxide or calcium oxide is also injected into the fluidized bed reactor. By solid circulation of the solids separated in a filter to the reactor, a circulating fluidized bed is formed in which the flue gas comes in contact with the sorbent and harmful gases are separated from the flue gas.

The flue gas is fed with the separated reaction products and the sorbent via a line from the fluidized bed reactor and dust is removed in a downstream filter system with solid separators. The cleaned flue gas can then be released. A large proportion of the sorbent thus separated with the reaction products can be returned to the fluidized bed reactor again.

It is known from the operation of systems using a circulating fluidized bed that cakings, mixtures of water and fine dust, form especially on the inner surface of the reactor chamber. During the cleaning process using spray water in the fluidized bed reactor, these cakings form particularly at the nozzle mouth of the water nozzles. The cakings are usually formed temporally and spatially non-uniformly in the fluidized bed reactors, which is why their formation is not predictable.

These cakings can on the one hand be caused by an inadequate solid loading of the fluidized bed due to an inappropriate configuration of the water jets, the position of the water jets with regard to the circumference of the reactor chamber and/or the height of the reactor chamber and the penetration depth of the water nozzles in the reactor chamber.

This can result in a disturbance of the uniform distribution of the recirculating solids and therefore in a reduction in the material contact and a reduction in the separation of harmful gases. These deposits can drop downwards and in so doing clog nozzles and supply lines of the reactor. Particularly with increasing size of the cakings, these can lead to considerable disturbances of the operation of the system.

DE 195 17 863 A1 describes a method for dry desulphurization of a combustion gas whereby the problem of cakings and agglutinations in the exhaust gas cleaning system is to be solved.

It was the object of the present invention to find a possible method whereby said cakings in a fluidized bed reactor can be substantially reduced or avoided and thus ensure substance and heat exchange during the reaction.

This object is solved by the method according to the invention for cleaning exhaust gases in which an exhaust gas and a sorbent are combined in a fluidized bed reactor, solid matter is segregated in a subsequent filter system and then up to 99% of the sorbent is re-channelled into the fluidized bed reactor, where the gas is subjected to a rotation about the flow axis in the fluidized bed reactor.

The circulating fluidized bed is thus superposed by a rotational movement along the flow axis of the gas, including the solids conveyed by said gas. A uniform separation of the solids at the reactor inner wall is thus achieved. Regions without solid deposition are thus reduced or even completely avoided.

The method according to the invention can used in dry and/or semi-dry cleaning methods in a fluidized bed reactor. Dry cleaning methods are to be understood in particular as methods such as are described, for example, in the documents DE 195 17 863 A1 and DE 699 19 424 T2.

"Exhaust gases" in the sense of the present invention are to be understood as all gaseous waste products which accumulate during a substance conversion process. This comprises flue gases from incineration plants, combustion gases, exhaust gases from internal combustion engines, as well as cold exhaust gases and exhaust gases from metallurgical processes such as sintering plants.

In one embodiment of the method according to the invention, the rotational movement of the gas is achieved by installations in at least one nozzle, which is located in the gas and sorbent injection region of the fluidized bed reactor and/or is produced by the inclination of the at least one nozzle and/or by the configuration of the supply line in the gas and sorbent injection region itself.

"Gas and sorbent injection region" is to be understood here as the region in which the lines for the raw gas supply, the sorbent and the cleaned gas and sorbent from the recirculation open into the fluidized bed reactor again.

The rotation is produced whereby the gas stream entering into the fluidized bed reactor is set in rotation along the flow axis by installations in the at least one nozzle or by the configuration of the inlet channels themselves without causing a large pressure loss in so doing. "Configuration of the inlet channels" is to be understood in the sense of the present invention by any geometrical configuration which can cause a rotational movement of the gas such as a helical configuration.

Preferably the direction of the nozzles can also be varied in such a manner that during flow of the gas through the nozzles, a rotation along the flow axis takes place. The rotation about the flow axis should not be so strong that a separation of the solids from the gas occurs as in a cyclone.

It is further preferred that the nozzles comprise single or multiple nozzles. The nozzles preferably comprise venturi nozzles.

The nozzle(s) additionally serve to keep the solid in the reactor above the nozzles and consequently prevent dropping of the solid from the fluidized bed into the gas inlet region located thereunder.

The venturi nozzles are operated at 30-70 m/s, preferably at 50 m/s. The inlet cone of a single nozzle preferably has an angle of 25-35°, particularly preferably 30°, from the perpendicular, the outlet cone preferably has an angle of 15-25°, particularly preferably 20°, from the perpendicular. In the case of multiple cones, the outlet cone preferably has an angle of 5-15°, particularly preferably 10°, from the perpendicular. Multiple nozzles end in the cone with an opening angle of preferably 15-25°, particularly preferably 20° from the perpendicular. The design is primarily intended to minimize the total pressure loss of the nozzle system. In an optimal configuration of multiple nozzles, all the nozzles run at the same speed.

In particular, it is preferable that the installations in the single or multiple nozzles comprise guide vanes. Guide vanes in the sense of the present invention are to be understood as vane-like installations in the nozzles through which the through-flowing gas is deflected so that it undergoes rotation along the flow axis. To this end, the guide vanes have an inclination which is a maximum of 10° in this case. If a plurality of guide vanes are provided in a nozzle, these must be aligned so that the gas undergoes a uniform rotation. If the guide vanes inside a nozzle or the individual nozzles of a multiple nozzle are aligned with respect to one another, the individual gas flows are braked and no uniform rotational movement takes place.

An arbitrary number of vanes can be used per nozzle, both in an individual nozzle and in multiple nozzles. However, a small number of vanes is preferred to ensure sufficient rotation.

It is furthermore a subject matter of the method according to the invention that the sorbent is introduced into the fluidized bed reactor below the single or multiple nozzles, the particles returned from the solid separator are introduced into the fluidized bed reactor below or above the single or multiple nozzles and the water is introduced into the fluidized bed reactor above the single or multiple nozzles.

In one embodiment of the method according to the invention, the fluidized bed reactor is operated at a temperature of 5° C. to 30° C. above the theoretical limit of cooling of the solid substances located in the fluidized bed reactor wherein the optimal reaction temperature is adjusted by injecting water.

It is furthermore preferred that a gas speed relative to the empty reactor of 2 m/s to 10 m/s and/or a mean solid residence time of 15 min to 200 min and/or a mean solid loading of 1 kg/m$^3$ to 10 kg/m$^3$ is adjusted in the fluidized bed reactor.

According to a further aspect of the present invention, 0% to 99%, preferably 20% to 99% of the solids segregated in the filter are re-channelled into the fluidized bed reactor.

In a further preferred embodiment the mean solid residence time in the case of a single passage through the fluidized bed reactor is between 5 sec and 60 sec and/or the minimum gas residence time in the absorber is 2 sec.

In particular it is preferred that the solid sorbent has a particle diameter d50 of 1 µm to 20 µm.

In a further embodiment of the method according to the invention, 0% to 100% pure gas is returned to the raw gas inlet.

Pure gas in the sense of the present invention is to be understood as cleaned raw gas (exhaust gas) which has passed through the fluidized bed reactor at least once.

Further advantages are obtained from an apparatus for carrying out a method for cleaning exhaust gases in a fluidized bed reactor, wherein the gas and sorbent injection region of the fluidized bed reactor is equipped such that the raw gas can be brought into a rotational movement about the flow axis in the fluidized bed reactor.

In one embodiment of the device according to the invention, in order to produce the rotational movement in the gas and sorbent injection region of the fluidized bed reactor, at least one nozzle is provided with installations.

It is further preferred that the module for producing the rotational movement can be retro-fitted. In a preferred embodiment the nozzles comprise single or multiple nozzles. In particular it is preferred that the installations in the single or multiple nozzles comprise guide vanes.

According to a further aspect of the present invention, the gas and sorbent injection region of the fluidized bed reactor is configured by specific shaping so that this serves to produce the rotational movement itself.

In a further preferred embodiment, the rotational movement in the gas and sorbent injection region of the fluidized bed reactor is produced by the inclination of the at least one nozzle.

The present invention is explained in detail with reference to the following figures, wherein.

Figure 1:
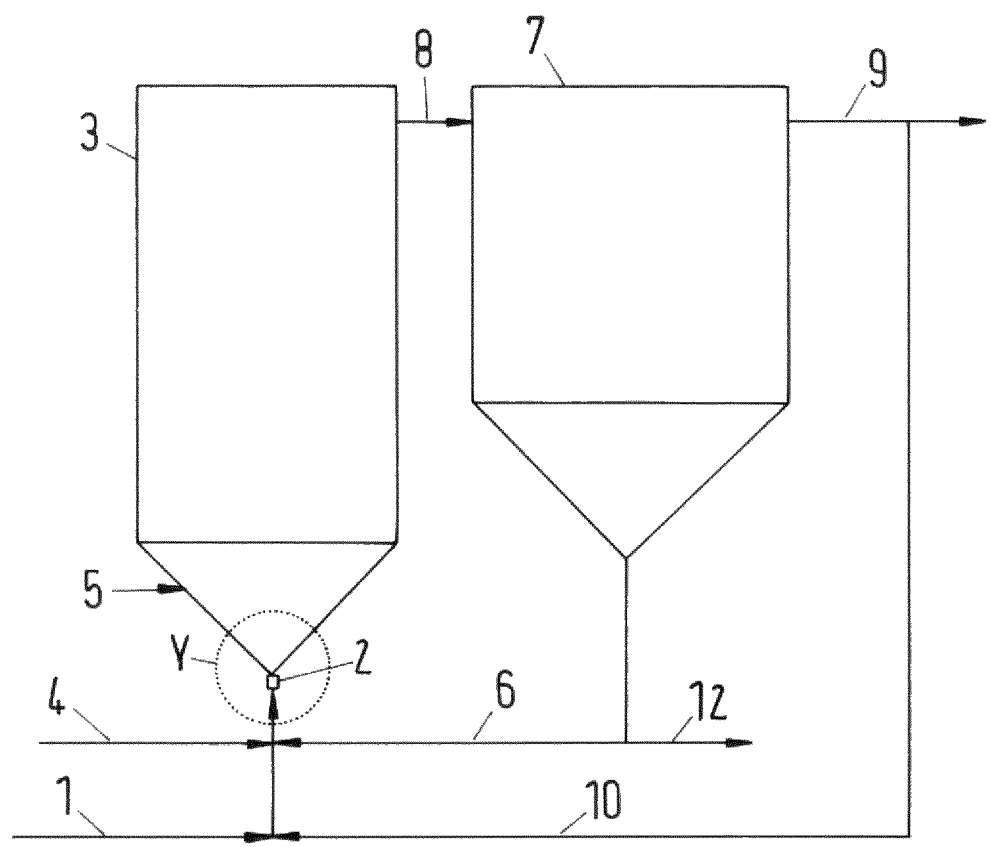
FIG. 1 shows a flow diagram of the method according to the invention.

FIG. 1 shows the flow diagram of the method according to the invention. The exhaust gas to be cleaned which contains gaseous pollutants and optionally fine-grained solids such as fly ash is introduced via a raw gas line (1) from below via a single or multiple nozzle (2) into the fluidized bed absorber (3). The fluidized bed absorber (3) consists of a vertically extending boiler, where the lower part is cone-shaped (5). The sorbent is introduced into the fluidized bed absorber (3) via a line (4). Preferably fine-grained solid calcium hydroxide (Ca(OH)$_2$) is used as sorbent (absorption material) to clean exhaust gases which contain acid pollutants such as $SO_N$, HCL and/or HF.

For optimal adjustment of the absorption temperature, which lies 5 to 30° C. about the theoretical limit of cooling of the solids located in the fluidized bed, water is sprayed into the lower conical absorber (5).

The acid components of the exhaust gas react in the expanded so-called circulating fluidized bed to form the solid reaction products which together with the solids contained in the raw gas such as fly ash and the sorbent form the expanded fluidized bed.

After passing through the fluidized bed reactor, the gas-solid mixture passes via a line (8) into a filter system with solid separator (7), where the gas is dedusted. The dedusted gas leaves the filter via the line (9) and when the system is partially loaded, can be supplied back to the raw gas line (1) via the return line (10) so that the fluidized bed reactor can always be operated independently of the raw gas stream at optimal gas speed and therefore optimal fluid dynamics.

Solids can be supplied back to the fluidized bed reactor via a line (6). In particular, a return of the sorbent via the line (6) is advantageous. The removal of the reaction product takes place via the line (12).

FIGS. 2 to 5 show examples for the design of the gas inlet into the fluidized bed reactor as single or as multiple nozzles for larger installations. A rotation of the gas in the direction of flow is accomplished through the arrangement of the guide vanes in the inlet cone of the individual or multiple nozzle.

Figure 2:
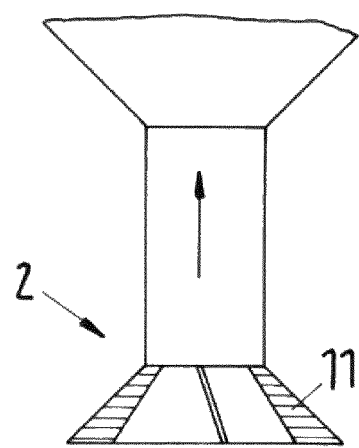
FIG. 2 shows a single nozzle with guide vanes in the gas inlet in side view, comprising the detail "Y" from FIG. 1.
Figure 3:
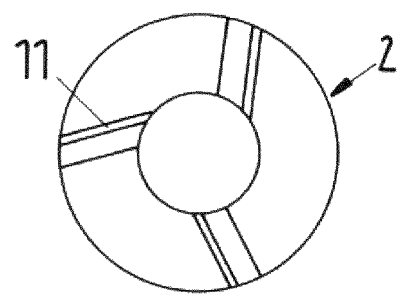
FIG. 3 shows a single nozzle with guide vanes in the gas inlet in plan view.

FIGS. 2 and 3 show a single nozzle in the detail section "Y". The single nozzle is fitted with three guide vanes (11) which are distributed uniformly in the nozzle, i.e. at an angle of 120° relative to the circular diameter of the nozzle. All the guide vanes of the nozzle have the same angle of inclination.

The venturi-like nozzles are operated at 30-70 m/s, preferably at 50 m/s. The inlet cone preferably encloses 30° from the perpendicular, the outlet cone 20° from the perpendicular. The construction is primarily designed to minimize the total pressure loss of the nozzle system.

Figure 4:
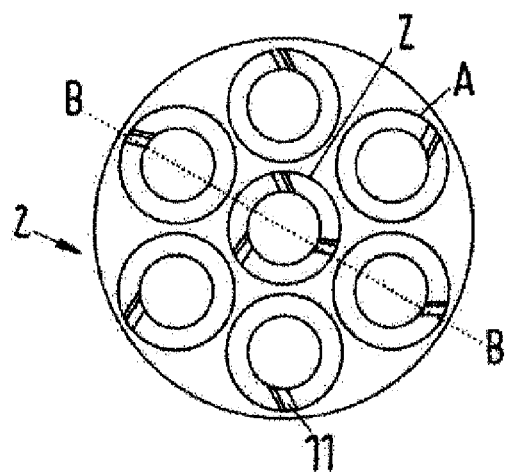
FIG. 4 shows a multiple nozzle with guide vanes in the gas inlet in plan view.
Figure 5:
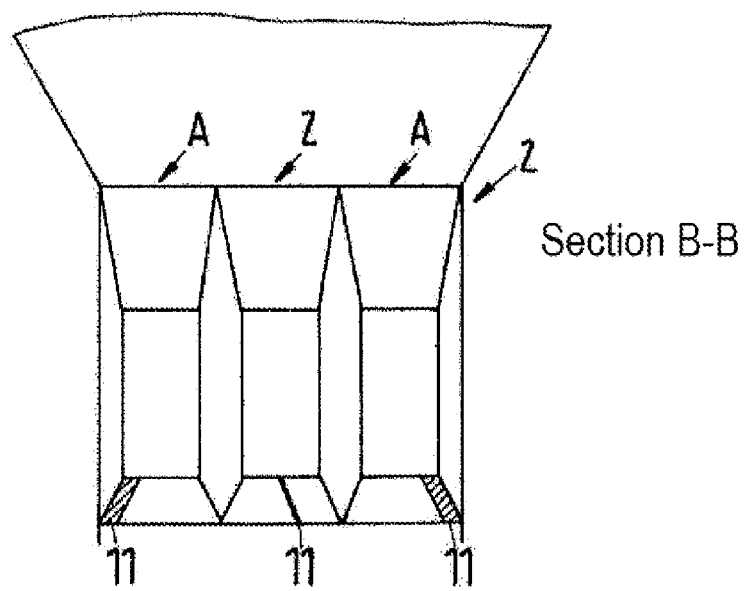
FIG. 5 shows a multiple nozzle with guide vanes in the gas inlet in side view.

FIGS. 4 and 5 show a multiple nozzle in detail section "Y". FIG. 5 shows the multiple nozzle from FIG. 4 in the sectional plane B-B. This multiple nozzle consists of 7 single nozzles, where the central nozzle (Z) is fitted with three guide vanes, which are distributed uniformly in the nozzle at an angle of 120° relative to the circular diameter of the nozzle and the outer six nozzles (A) are each fitted with one guide vane. All the guide vanes of the multiple nozzles have the same angle of inclination.

In multiple nozzles, the exit cone has an angle of 10° from the perpendicular. Multiple nozzles end in a cone having the opening angle of 20° from the perpendicular. In an optimal configuration of the multiple nozzles, all the nozzles run at the same speed.

REFERENCE LIST

1. Raw gas line
2. Nozzle (single or multiple nozzle)
3. Fluidized bed absorber
4. Sorbent line
5. Cone-shaped part of the fluidized bed absorber
6. Recirculation of the sorbent
7. Filter system with solid separator
8. Line
9. Line
10. Return line of the cleaned raw gas
11. Guide vane
12. Removal of the reaction product
A. Nozzle in the outer ring of a multiple nozzle
Z. Central nozzle of a multiple nozzle

The invention claimed is:

1. Method for cleaning exhaust gases comprising combining an exhaust gas and a sorbent in a fluidized bed reactor, segregating solid matter in a subsequent filter system and then re-channeling up to 99% of the sorbent into the fluidized bed reactor,
   wherein the fluidized bed reactor comprises an expanded circulating fluidized bed and that the gas is subjected to a rotation about the flow axis in the fluidized bed reactor,
   wherein the rotational movement of the gas is achieved by installations in at least one nozzle, which is located in the gas and sorbent injection region of the fluidized bed reactor and the at least one nozzle comprises single or multiple nozzles and the installations in the single or multiple nozzles comprise guide vanes, and
   adjusting a gas speed relative to the empty reactor of 2 m/s to 10 m/s and/or a mean solid residence time of 15 min to 200 min by external solids recirculation and/or a mean solid loading of 1 kg/m$^3$ to 10 kg/m$^3$ in the fluidized bed reactor.

2. The method according to claim 1, wherein the rotational movement of the gas is produced by the inclination of the at least one nozzle and/or by the configuration of the supply line in the gas and sorbent injection region itself.

3. The method according to claim 1, wherein the sorbent is introduced into the fluidized bed reactor below the single or multiple nozzles, the particles returned from the solid separator are introduced into the fluidized bed reactor below or above the single or multiple nozzles and the water is introduced into the fluidized bed reactor above the single or multiple nozzles.

4. The method according to claim 1, wherein the fluidized bed reactor is operated at a temperature of 5° C. to 30° C. above the theoretical limit of cooling of the solid substances located in the fluidized bed reactor wherein the optimal reaction temperature is adjusted by injecting water.

5. The method according to claim 1, wherein 0% to 99% of the solids segregated in the filter are re-channelled into the fluidized bed reactor.

6. The method according to claim 1, wherein the mean solid residence time in the case of a single passage through the fluidized bed reactor is between 5 sec and 60 sec and/or the minimum gas residence time in the absorber is 2 sec.

7. The method according to claim 1, wherein the solid sorbent has a particle diameter d50 of 1 μm to 20 μm.

8. The method according to claim 1, wherein 0% to 100% pure gas is returned to the raw gas inlet.

9. Apparatus for carrying out a method for cleaning exhaust gases in a fluidized bed reactor, comprising a fluidized bed reactor that includes an expanded circulating fluidized bed and wherein a gas and sorbent injection region of the fluidized bed reactor is equipped such that the raw gas can be brought into a rotational movement about the flow axis in the fluidized bed reactor, wherein in order to produce the rotational movement in the gas and sorbent injection region of the fluidized bed reactor, at least one nozzle is provided with installations and the nozzles comprise single or multiple nozzles and the installations in the single or multiple nozzles comprise guide vanes, and
   wherein a gas speed relative to the empty reactor of 2 m/s 10 m/s and/or a mean solid residence time of 15 min to 200 min by external recirculation and/or a mean solid loading of 1 kg/m$^3$ to 10 kg/m$^3$ is adjusted in the fluidized bed reactor.

10. Apparatus according to claim 9, wherein the rotational movement of the gas is produced by the inclination of the at least one nozzle and/or by the configuration of the supply line in the gas and sorbent injection region itself.

* * * * *

UNITED STATES PATENT AND TRADEMARK OFFICE
CERTIFICATE OF CORRECTION

| | | |
|---|---|---|
| PATENT NO. | : 9,040,004 B2 | Page 1 of 1 |
| APPLICATION NO. | : 14/239173 | |
| DATED | : May 26, 2015 | |
| INVENTOR(S) | : Harald Sauer | |

It is certified that error appears in the above-identified patent and that said Letters Patent is hereby corrected as shown below:

On the Title Page, (73), replace "Assignee: Fujiang Lonjing Environment Technology Co., Ltd., Fujian (CN)" with --Assignee: Fujian Lonjing Environment Technology Co., Ltd.--

Signed and Sealed this
Fifteenth Day of September, 2015

Michelle K. Lee
*Director of the United States Patent and Trademark Office*